(12) United States Patent
Nimon et al.

(10) Patent No.: US 9,143,333 B2
(45) Date of Patent: *Sep. 22, 2015

(54) SYSTEM AND METHOD FOR MULTICAST TRANSMISSION

(71) Applicant: Upload Technologies S.A.

(72) Inventors: Robert E. Nimon, Dallas, TX (US);
David E. Espenlaub, Dallas, TX (US);
Francis Dinha, San Ramon, CA (US);
James Yonan, Boulder, CO (US)

(73) Assignee: Upload Technologies S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,920

(22) Filed: Jul. 22, 2014

(65) Prior Publication Data

US 2014/0334339 A1  Nov. 13, 2014

Related U.S. Application Data

(63) Continuation of application No. 13/662,133, filed on Oct. 26, 2012, now Pat. No. 8,787,205, which is a continuation of application No. 12/849,728, filed on Aug. 3, 2010, now Pat. No. 8,300,553, which is a (Continued)

(51) Int. Cl.
*H04L 12/28* (2006.01)
*H04L 12/18* (2006.01)
(Continued)

(52) U.S. Cl.
CPC .............. *H04L 12/18* (2013.01); *H04L 45/02* (2013.01); *H04L 45/122* (2013.01); *H04L 45/16* (2013.01); *H04L 45/04* (2013.01); *H04L 45/42* (2013.01)

(58) Field of Classification Search
CPC .......... H04L 12/18; H04L 45/02; H04L 45/04; H04L 45/122; H04L 45/16; H04L 45/42; H04L 41/12; H04L 65/4076
USPC ................................. 370/254, 351, 389, 390
See application file for complete search history.

(56) References Cited

U.S. PATENT DOCUMENTS 5,511,168 A * 4/1996 Perlman et al. ............... 709/243
6,047,330 A * 4/2000 Stracke, Jr. .................. 709/238

(Continued)

FOREIGN PATENT DOCUMENTS

JP        2006-074379       3/2006
WO  PCT/US2008/003261     7/2008

OTHER PUBLICATIONS

Bellur, Bhargav and Ogier, Richard G.; A Reliable, Efficient Topology Broadcast Protocol for Dynamic Networks; SRI International, Menlo, CA ; IEEE INFOCOM '99.

(Continued)

*Primary Examiner* — Chi H Pham
*Assistant Examiner* — Robert Lopata
(74) *Attorney, Agent, or Firm* — Scott T. Griggs; Griggs Bergen LLP

(57) ABSTRACT

A system and method for multicast transmission are disclosed. In one embodiment, a virtual exchange network including interconnected nodes is embedded within a network. A sender is disposed in communication with a root node and receivers are disposed in communication with a set of edge nodes. The sender publishes a packetized data stream to which the receivers subscribe. The packetized data stream is promulgated by implicit signaling through optimum virtual exchange network connections from the sender through the virtual exchange network to the receivers. The interconnected nodes, responsive to receiving the published packetized data stream, are adapted to multicast N instances of the published packetized data stream to N recipients selected from the group consisting of receivers and other of the interconnected nodes.

11 Claims, 7 Drawing Sheets

Related U.S. Application Data continuation of application No. 12/047,281, filed on Mar. 12, 2008, now Pat. No. 8,000,261.

(60) Provisional application No. 60/894,372, filed on Mar. 12, 2007.

(51) Int. Cl.
*H04L 12/751* (2013.01)
*H04L 12/733* (2013.01)
*H04L 12/761* (2013.01)
*H04L 12/715* (2013.01)
*H04L 12/717* (2013.01)

(56) References Cited

U.S. PATENT DOCUMENTS

| | | | |
|---|---|---|---|
| 6,115,372 | A | 9/2000 | Dinha |
| 6,148,005 | A | 11/2000 | Paul |
| 6,574,663 | B1 * | 6/2003 | Bakshi et al. ............... 709/223 |
| 6,697,365 | B1 | 2/2004 | Messenger |
| 6,728,784 | B1 | 4/2004 | Mattaway |
| 6,778,541 | B2 | 8/2004 | Houston et al. |
| 6,785,285 | B1 | 8/2004 | Romana et al. |
| 6,845,091 | B2 | 1/2005 | Ogier et al. |
| 7,110,367 | B2 | 9/2006 | Moriya |
| 7,146,426 | B2 | 12/2006 | Hashimoto |
| 7,304,955 | B2 | 12/2007 | Lee |
| 7,307,945 | B2 | 12/2007 | Gerdisch et al. |
| 7,339,929 | B2 * | 3/2008 | Zelig et al. ............... 370/390 |
| 7,558,951 | B2 * | 7/2009 | Munshi ............... 713/150 |
| 8,000,261 | B2 * | 8/2011 | Nimon et al. ............... 370/254 |
| 8,300,553 | B2 | 10/2012 | Nimon et al. |
| 8,787,205 | B2 | 7/2014 | Nimon et al. |
| 2003/0023918 | A1 | 1/2003 | Wu |
| 2004/0088309 | A1 | 5/2004 | Koh et al. |
| 2005/0108576 | A1 | 5/2005 | Munshi |
| 2005/0152286 | A1 | 7/2005 | Betts et al. |
| 2005/0157646 | A1 | 7/2005 | Addagatla et al. |
| 2005/0201406 | A1 | 9/2005 | Sekine et al. |
| 2005/0249233 | A1 * | 11/2005 | Akaba et al. ............... 370/432 |
| 2008/0037425 | A1 * | 2/2008 | Pan et al. ............... 370/235 |
| 2008/0235116 | A1 * | 9/2008 | Jensen ............... 705/28 |

OTHER PUBLICATIONS

Chiu, Dah-Ming; Hurst, Stephen, Kadansky, Miriam and Wesley, Joseph; TRAM: A Tree-based Reliable Multicast Protocol; Sun Microsystems M/S MTV29-01; Palo Alto, CA; Jul. 1998.

Haerri, Jerome and Bonnet, Christian; On the Classification of Routing Protocols in Mobile Ad-Hoc-Networks Abstract; EURECOM Sophia Antipolis; Sophia-Antipolis; France; Research Report RR-04-115; Aug. 25, 2004.

Paul Sanjoy; Sabriana, Krisham K; Lin, John C.; and Bhattacharyya, Supratik; Reliable Multicast Transport Protocol (RMTP); IEEE Infocom; Mar. 1996.

UDP Broadcast Flooding; Internetworking Case Studies; Chapter 6; Cisco Systems, Inc.; 1992-2008.

Kwon, Minseok; Fahmy, Sonia; Path-aware overlay multi-cast, Computer Networks, Elsevier Science Publishers B.V., Amsterdam, NL, vol. 47, No. 1, Jan. 14, 2005, pp. 23-45.

15 5 Spec Draft; 15-06-0237-02-0005-15-5-spec-draft, IEEE Draft; IEEE-SA Mentor, Piscataway, NJ, USA, vol. 802.155, No. 2, Jul. 21, 2006, pp. 1-108.

* cited by examiner

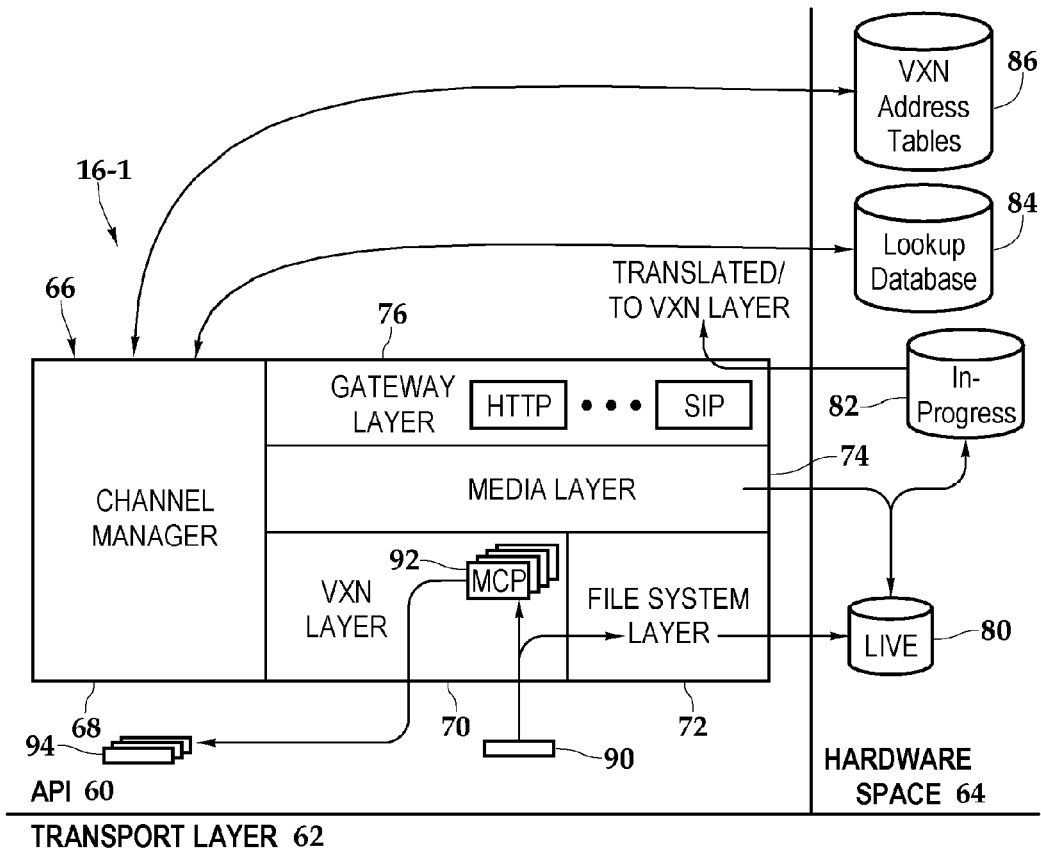
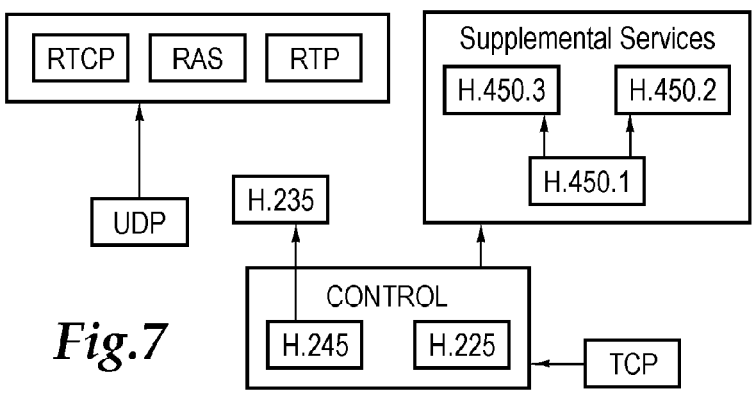
Fig.7
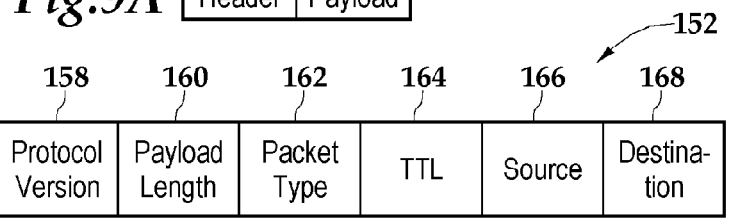
Fig.9A
Fig.9B

SYSTEM AND METHOD FOR MULTICAST TRANSMISSION

PRIORITY STATEMENT & CROSS-REFERENCE TO RELATED APPLICATIONS

This application is a continuation of co-pending U.S. patent application Ser. No. 13/662,133 entitled "System and Method for Multicast Transmission" and filed on Oct. 26, 2012 in the names of Nimon et al.; which is a continuation of U.S. patent application Ser. No. 12/849,728 entitled "System and Method for Multicast Transmission" and filed on Aug. 3, 2010 in the names of Nimon et al., now U.S. Pat. No. 8,300,553 and issued on Oct. 30, 2012; which is a continuation of U.S. patent application Ser. No. 12/047,281 entitled "System and Method for Multicast Transmission", filed on Mar. 12, 2008 in the names of Nimon et al., now U.S. Pat. No. 8,000,261, and issued on Aug. 16, 2011; which claims priority from U.S. Patent Application No. 60/894,372, entitled "Virtual Exchange Network" and filed on Mar. 12, 2007, in the names of Francis Dinha, Robert E. Nimon, and David E. Espenlaub; all of which are hereby incorporated by reference for all purposes.

TECHNICAL FIELD OF THE INVENTION

This invention relates, in general, to bulk data transfer applications and, in particular, to a system and method for multicast transmission that provides a virtual exchange network to enable the substantially simultaneous distribution of significant amounts of identical data from, for example, a single sender to multiple receivers.

BACKGROUND OF THE INVENTION

Most high-level network protocols, such as ISO Transport Protocols, TCP, or UDP, only provide unicast transmission services. That is, nodes of the network only have the ability to send to one other node at a time. This inherently point-to-point transmission service must perform replicated unicasts to send multiple copies of the transmission data in turn to each destination.

On the other hand, multicast transmission services provide an efficient way of disseminating data from a single sender to multiple receivers. Instead of sending a separate copy of the data to each individual recipient, the sender just sends a single copy which is delivered to all of the receivers. Reliable, fault tolerant existing multicast solutions, however, utilize hardware level implementations which naturally restrict portability and limit the deployability of the multicast transmission services. These hardware level solutions, which include server-based and router-based solutions, are not economically scalable and are difficult to administer for supporting multicast and broadcast applications. There is a significant need for a software-based solution that is simple to use and administer, economically scalable, portable over a wide variety of operating environments, and designed with features to support broad communication services, enabling point-to-point, multicast, and broadcast services.

SUMMARY OF THE INVENTION

A system and method for multicast transmission are disclosed. In one embodiment, a Virtual Exchange Network (VXN) including interconnected nodes (VXN nodes) is embedded within a network. A sender is disposed in communication with a root node and receivers are disposed in communication with a set of edge nodes. The sender publishes a packetized data stream to which the receivers subscribe. The packetized data stream is propagated by implicit signaling through optimum virtual exchange network connections from the sender through the virtual exchange network to the receivers. Each of the interconnected nodes, responsive to receiving the published packetized data stream, is adapted to multicast N instances of the published packetized data stream to N recipients which may include receivers and/or interconnected nodes.

The teachings presented herein enable existing networking infrastructures to multicast packetized data streams through an unlimited number of multicast points and to an unlimited number of users. No administrative overhead is required other than application control of port allocation to set up large conference bridges, as the multicasting capabilities are dynamically configurable. Using a publish and subscription model furnishes wide flexibility and use of the multicast connections so that each receiver has the ability to select to receive from any number of publishing senders, without any special configuration or pre-administration steps.

The VXN and VXN nodes provide a simple and highly scalable solution for enabling point-to-point, multicast, and broadcast services that provide for realtime data exchange across a network such as the Internet, automatic failover recovery within the VXN, as well as flexible media communication topologies to send, receive, unicast, multicast, and broadcast data streams across any IP network. This avoids the need to administer router capacity for conference sessions, for example, and other application while furnishing capacity for a large number of data stream receivers for broadcast applications.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 7 is a block diagram of one embodiment of the layered architecture of a Virtual Exchange Network (VXN) node;

FIGS. 9A and 9B are block diagrams of one embodiment of a VXN packet structure.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
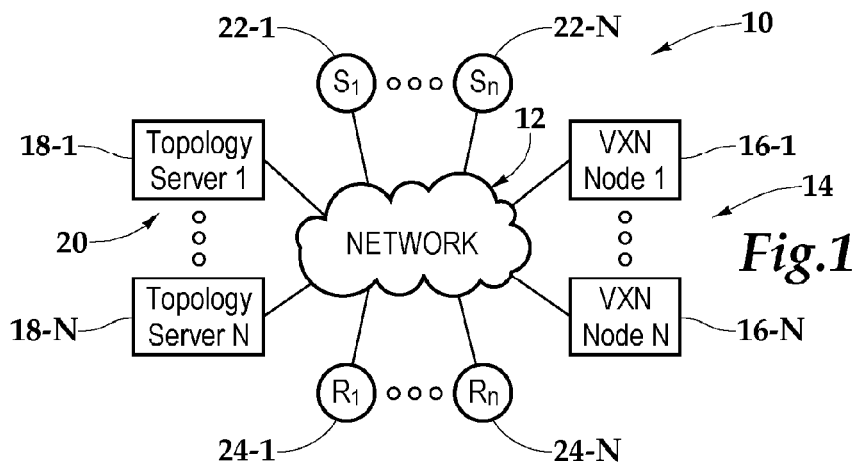
FIG. 1 is a block diagram of a network adapted for multicast transmission according to embodiments presented herein.

Referring initially to FIG. 1, therein is depicted a system for multicast transmission 10 implemented on a network 12 according to embodiments of the teachings presented herein. A virtual exchange network (VXN) 14 for enabling reliable multicasts is embedded within the network 12 and includes interconnected VXN nodes 1 through N, which are numbered 16-1 through 16-N. Topology servers 18-1 through 18-N, which form a topology server subsystem 20, are interconnected in peer-to-peer relationships. It should be understood that the topology server subsystem 20 may include only one topology server and redundancy may form a portion of the topology server subsystem 20. Additionally, the topology servers are disposed in communication with the VXN 14. Senders 22-1 through 22-N are connected to the VXN 14 to publish content. Receivers 24-1 through 24-N are reciprocally connected to the VXN 14 to subscribe to and receive the published content.

The VXN 14 multicasting provides an efficient way of disseminating data from the sender 22-1, for example, to a group of receivers 24-1 through 24-N. Instead of sending a separate copy of the data to each individual receiver 24, the sender 22-1 sends a single copy which is replicated to all of the receivers 24-1 through 24-N. The VXN 14 allows receivers to join VXN multicasts and exchange substantially real-time packetized data streams across the network 12. As will be discussed in further detail hereinbelow, without any additional effort or transmissions from the sender 22-1, the VXN nodes 16-1 through 16-N act as multicast points that permit any application to transmit packetized data streams to any other VXN node 16-1 through 16-N and allow any receiver 24-1 through 24-N to receive packetized data streams from any VXN node 16-1 through 16-N. The VXN 14 thereby enables unique communication services that are not possible with the existing IP networks.

The multicasting capabilities of VXN 14 provide for point-to-multipoint and multipoint-to-multipoint multicasts including live content, in-progress content, and on-demand content. The multicast content may relate to different multicasting applications having, in general, different requirements. By way of example, a real-time multipoint-to-multipoint multimedia multicasting application, such as nationwide video conferencing is enabled as is a point-to-multipoint data transfer application, such as the distribution of software or recorded or in-progress live event content.

With respect to the in-progress content, the VXN 14 provides recording capabilities that permit recorded packetized data streams to be time-shifted. For example, a sender begins transmitting content at 8 PM and concludes at 9 PM. A receiver could receive this content live from 8 PM or 9 PM. Additionally, the receiver may begin receiving the content during transmission. At 8:05 PM, for example, the receiver may begin receiving the 8 PM content and be time-shifted by minus 5 minutes or delayed 5 minutes during the multicast. Therefore, the multicast would end at 9:05 for this receiver. Moreover, the VXN 14 recording capabilities provide a receiver that joins an in-progress multicast with the ability to navigate the multicast from the inception up to the live portion and even join the live portion. Further, the capability to alternate between receiving a time-shifted multicast and a live multicast is furnished. Following the completion of the multicast, the VXN 14 servers the receivers on-demand instances of the multicast as requested.

Figure 2:
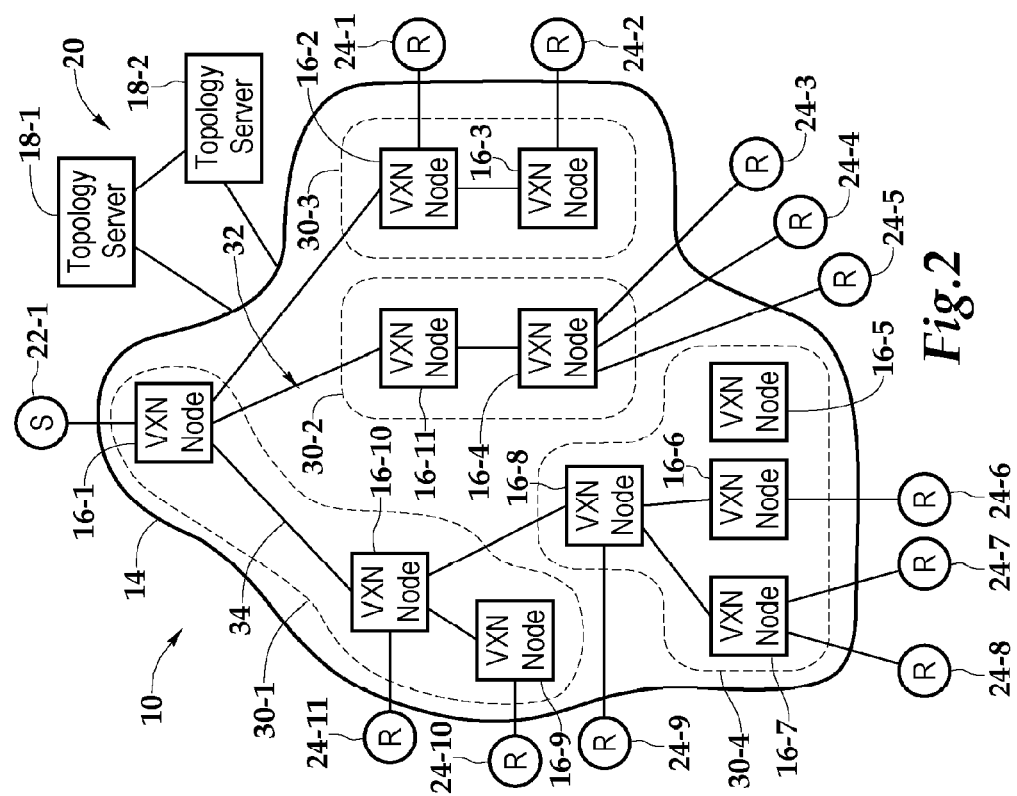
FIG. 2 is a conceptual illustration of a multicast tree illustrating one embodiment of a system for multicast transmission implemented for point-to-multipoint transmissions.

FIG. 2 depicts a multicast tree illustrating one embodiment of the system 10 implemented for point-to-multipoint multicast transmissions from sender 22-1 to receivers 24-1 through 24-11 via the VXN 14, which includes interconnected VXN nodes 16-1 through 16-11. It should be appreciated, however, that the VXN 14 may include any number and topology of VXN nodes. The topology server subsystem 20 has complete knowledge of the VXN 14, which as depicted, is deployed in a multi-level hierarchy of local zones 30-1 through 30-4. In one implementation, each topology server 18-1, 18-2 manages one or more of the local zones 30-1 through 30-4. For example, the topology server 18-1 manages local zones 30-1, 30-2 and the topology server 18-2 manages 30-3, 30-4. The topology server subsystem 20 collects information about the local state of each of the VXN nodes 16-1 through 16-11 within its respective local zones 30-1 through 30-4. The collected information includes usable port interfaces and reachable neighbors, for example, and based on this information the topology server subsystem 20 determines the path costs between each pair of VXN nodes 16-1 through 16-11.

Using an open shortest path first protocol, such as a Dijkstra-based algorithm, the topology server subsystem 20 generates a global multicast topology map that includes the optimum VXN connection between any two VXN nodes 16-1 through 16-11 acting as endpoint pairs, i.e., a root node to an edge node acting as a destination node. Of course, the global multicast topology map may support multiple paths of equal cost and, in one implementation, the next "hop address" are determined by choosing the best eventual root-to-destination path. Further, the optimum VXN connection may be determined based upon minimum cost path analysis, load, favorable conditions analysis, and other traffic management factors. The optimum VXN connection may be regularly re-optimized to satisfy and adapt to dynamically changing network conditions. The topology server subsystem 20 utilizes the global multicast topology map to build local multicast routing topology maps to populate each of the VXN nodes 16-1 through 16-11 and other network elements, such as routers, that may be included in the VXN 14. Each of the local multicast topology maps is a subset of the global multicast routing topology map to provide information for a defined area of the VXN 14. For a given router, for example, by providing the router with only a local multicast topology map, global information is hidden to the router to enable an additional level of routing protection and a reduction in routing protocol traffic.

As illustrated, the sender 22-1 is disposed in communication with VXN node 16-1, which is a root node. The sender 22-1 is publishing packetized data streams as part of a multicast. This publication is associated with a VXN address as well as an application assigned or arbitrarily assigned multicast name, in particular implementations. In one embodiment, with the root VXN node 16-1 known, the topology server subsystem 20 generates a global multicast routing topology map 32 and local multicast topology maps specific to the VXN address. The local multicast topology maps are appropriately populated in the VXN 14.

Receivers 24-1 through 24-11 are disposed in communication with a set of VXN nodes 16-2 through 16-4, 16-6 through 16-7, and 16-9 through 16-10. Receivers 24-1 through 24-11 are respectively subscribing to the published packetized data streams from the sender 22-1. With respect to receiver 24-11 as an illustrative example, receiver 24-11 sends a subscription signal to VXN node 16-10. In one implementation of the VXN 14 subscription model, implicit signaling is employed such that a receiver, such as receiver 24-11, can subscribe to a multicast address (and therefore the multicast) by sending a subscription signal having a packet to an edge VXN node, such as VXN node 16-10, over a provided optimum VXN connection. The act of transmitting a packet to a VXN address implicitly causes the VXN 14 to subscribe the receiver to the VXN address associated with the multicast by the destination address associated with the subscription signal. In one configuration, a receiver may subscribe to a VXN address by sending a null packet (of data length=0) to the VXN address. This null packet is not propagated to other receivers. Rather the null packet subscribes the receiver to the VXN address denoted by the destination address of the sent null packet.

In response to receiving the subscription signal, VXN node 16-10 associates receiver 24-11 with the VXN address assigned to the published packetized data streams from the sender 22-1. In response to receiving the published packetized data streams, the VXN node 16-10 will forward the published packetized data streams to the receiver 24-11. In one embodiment, the VXN node 16-10 maintains a table with porting information identifying all receivers and other VXN nodes that are subscribing to the particular VXN address.

Further, as the VXN node 16-10 has not subscribed to the packetized data streams, the VXN node 16-10 sends a subscription signal, which may be considered a derivative of the original subscription signal from receiver 24-11, to VXN node 16-1, which is the root node. The VXN node 16-1 will then forward the published packetized data streams to the VXN node 16-10, which in turn, forwards the published packetized data streams to receiver 24-11. For the portion of the multicast from the sender 22-1 to the receiver 24-11, the path from VXN node 16-1 to VXN node 16-10 comprises an optimum VXN connection 34 where subscription signals successively regressively traversed the optimum VXN connection 34 in the form of subscription signals and derivative subscription signals until the connection defined by the endpoints, i.e., the root VXN node 16-1 and the edge VXN node 16-10, was realized. This optimum VXN connection 34 is included in the global multicast routing topology map 32 stored at the topology server subsystem 20 and implemented within the VXN 14 by the local multicast routing topology maps.

With respect to the receiver 24-9 as a further illustrative example, the receiver 24-9 sends a subscription signal to the VXN node 16-8, which servers as the edge node to the receiver 24-9. In enabling the subscription process, the VXN node 16-8 then sends a derivative subscription signal to the VXN node 16-10 based on the content of the local multicast routing topology map installed therein. As the VXN node 16-10 is already subscribing to the packetized data stream, the VXN node 16-10 does not send a second subscription signal to the VXN node 16-1 since, with respect to receiver 24-9, an optimum virtual exchange network connection 36 between the endpoints of the VXN node 16-1 and the VXN node 16-8 is realized.

With respect to complete behavior of the VXN node 16-10, once the receiver 24-10 is likewise subscribing to the packetized data stream, the VXN node 16-10 is a multicast point for the packetized data stream. Upon receiving an instance of the packetized data stream, the VXN node 16-10 transmits three instances of the packetized data stream. The recipients being receiver 24-11, the VXN node 16-9, and the VXN node 16-8. More generally, each of the VXN nodes 16-1 through 16-11 are adapted as multicast points to multicast N instances of the received published packetized data stream to N recipients, which may include other VXN nodes or receivers, for example.

The multicast capabilities of other VXN nodes that serve to create the global multicast routing topology map 32 are illustrated as well. For example, more than one receiver may subscribe to a particular VXN node as shown by receivers 24-3 through 24-5 being disposed in communication with the VXN node 16-4. Other types of VXN 14 behavior are exhibited by the global multicast routing topology map 32. For example, VXN node 16-5, which is part of the VXN 14, is disposed in close proximity to the receiver 24-5, however VXN node 16-5 does not form a portion of the global multicast routing topology map 32 for the multicast by the sender 22-1 assigned the aforementioned VXN address as the path costs associated with the VXN node 16-5 are too high. In operation, the multicast capabilities and behaviors of the VXN nodes 16-1 through 16-11 of the VXN 14 propagate the packetized data stream by implicit signaling through the optimum virtual exchange network connections according to the local multicast routing topology maps.

Figure 3:
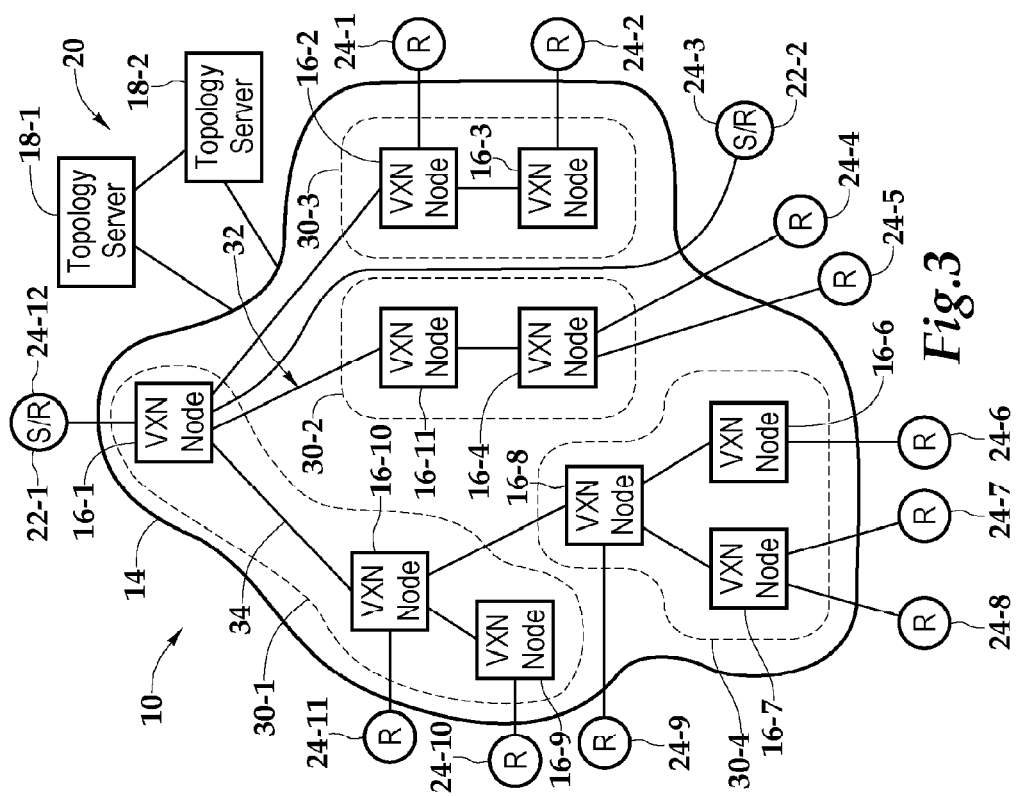
FIG. 3 is a conceptual illustration of another multicast tree illustrating another embodiment of a system for multicast transmission implemented for multipoint-to-multipoint transmissions.

FIG. 3 depicts one embodiment of a system for multicast transmission implemented for multipoint-to-multipoint transmissions. In this embodiment, there are two senders, senders 22-1 and 22-2, which are also receivers, receiver 24-12 and 24-3, respectively. The senders 22-1 and 22-2 utilize the same root VXN node 16-1 and the packetized data streams of the senders 22-1 and 22-2 have identical VXN addresses for purposes of propagating the packetized data streams. The VXN 14 behavior, otherwise, is the same as that presented and described in FIG. 2.

Figure 4:
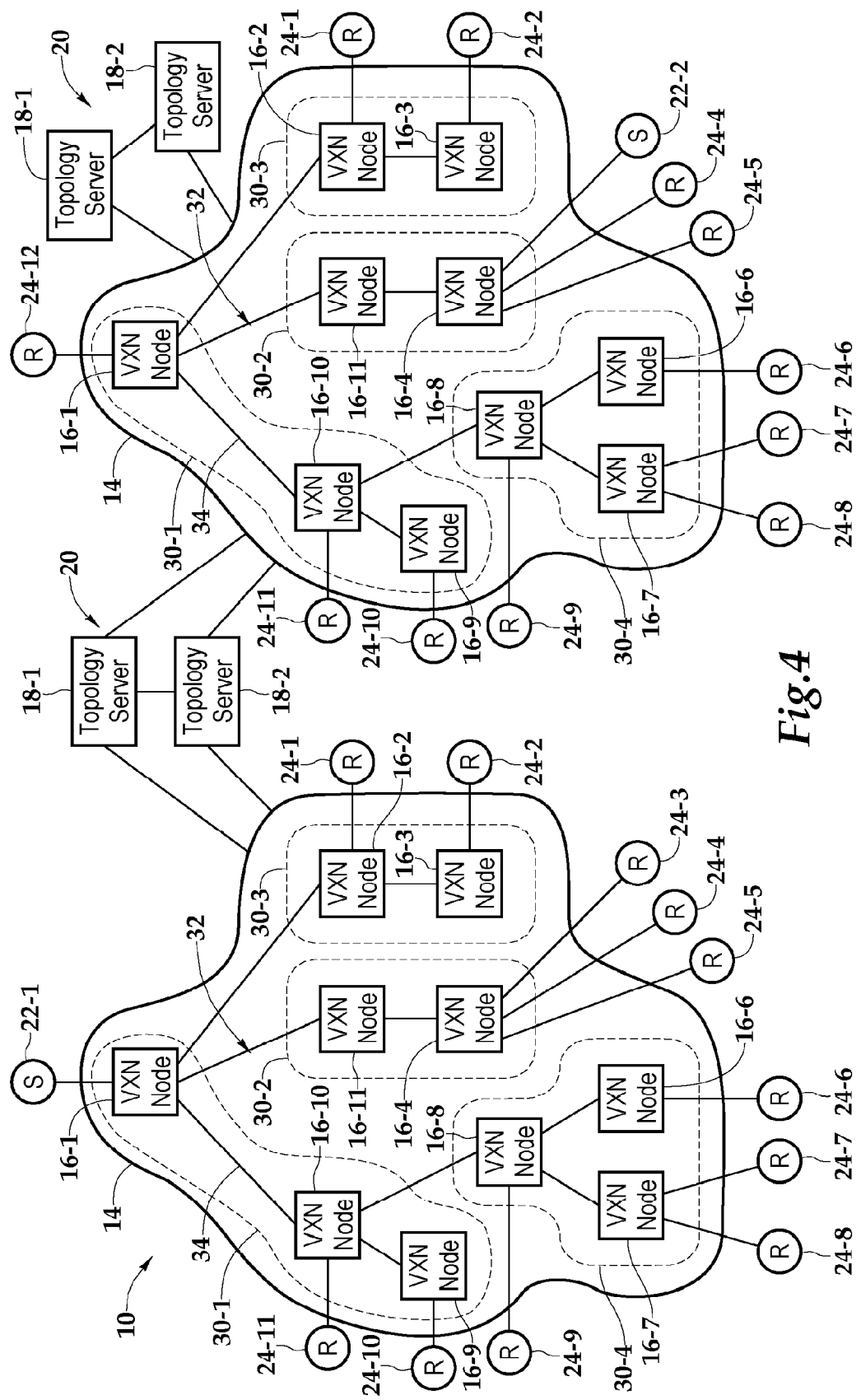
FIG. 4 is a conceptual illustration of a further multicast tree illustrating a further embodiment of a system for multicast transmission implemented for multipoint-to-multipoint transmissions.

FIG. 4 depicts another embodiment of a system for multicast transmission implemented for multipoint-to-multipoint transmissions. In this embodiment, two global multicast routing topology maps are generated; namely, one for each sender 22-1, 22-2. The packetized data streams associated with each sender 22-1, 22-2 are affiliated with separate VXN addresses and the receivers 24-1 through 24-12 subscribe to each of the multicasts simultaneously. In this multipoint-to-multipoint, each sender/receiver (22-1, 24-12); (22-2, 24-4) is a publishing entity and each receiver including the sender/receivers 22-1, 24-12); (22-2, 24-4) listen to each publisher, other than themselves. As the size of a multipoint-to-multipoint multicast increases in scale, the number of receivers may far exceed the number of senders and the VXN 14 provides for a smooth transition to these non-symmetric configurations maintaining the same efficient port usage and transparency to end users without any administrative effort.

The receiver selections can also be dynamically changed without any impact on the senders or the other listeners to the publishers. Through the use of additional VXN nodes to subscribe to the published packetized data stream, the number of potential receivers can readily be multiplied by layering multiple VXN nodes (Please see, for example, the layering of VXN nodes 16-10, 16-8, 16-6, 16-7) to produce an audience of any size, including an audience in excess of millions of receivers. The scalability of the VXN 14 therefore may range from unilateral or duplexed point-to-point communications to point-to-multipoint multicasts to multipoint-to-multipoint multicasts including broadcasts. The layering capability of the VXN nodes allows the VXN 14 to dynamically and seamlessly transition within this range of capabilities without administrative intervention.

Figure 5:
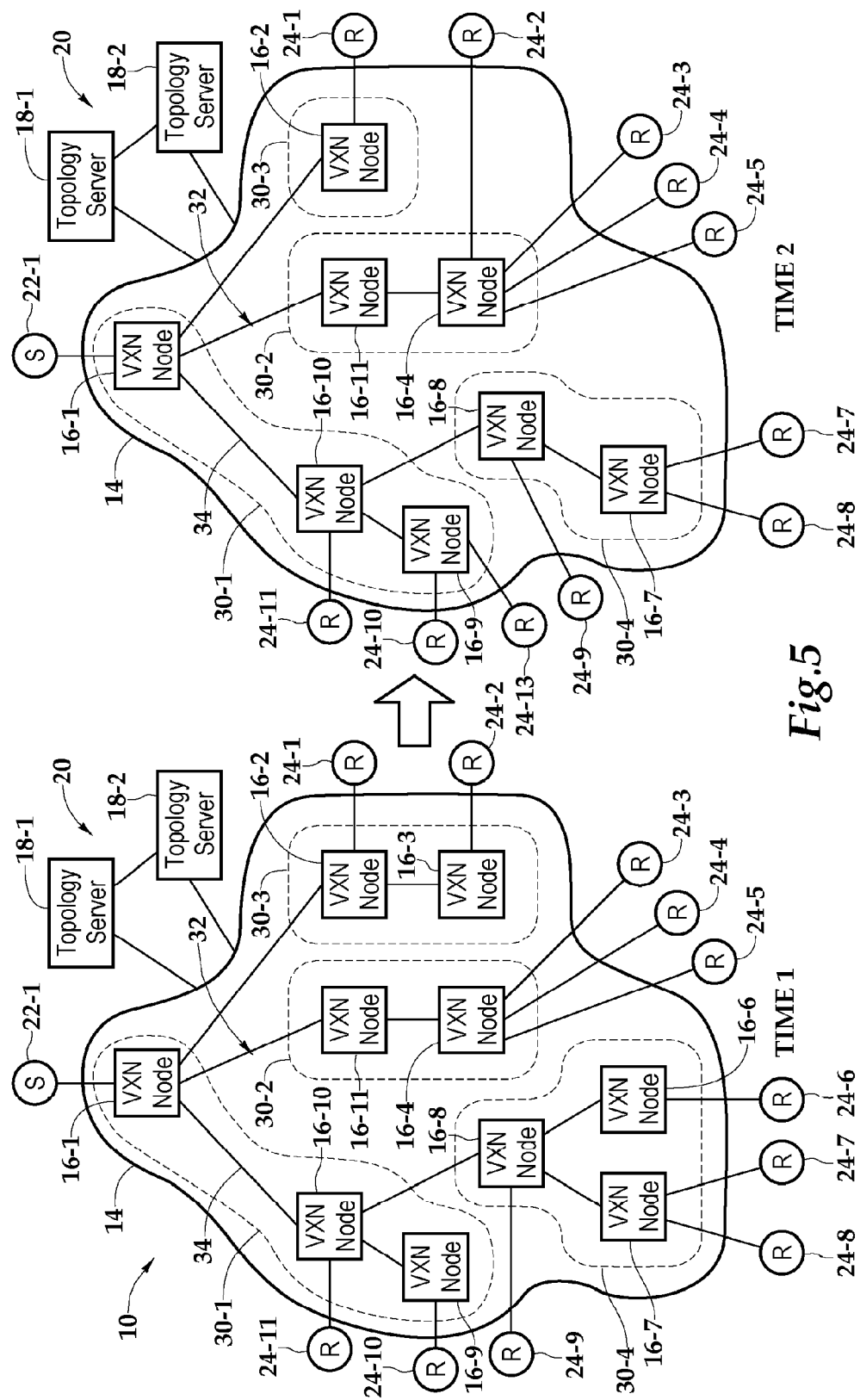
FIG. 5 is a conceptual illustration of the multicast tree of FIG. 2 undergoing one embodiment of topology management.

FIG. 5 depicts one embodiment of topology management as the VXN 14 undergoes changes from a Time 1 to a Time 2. Specifically, the changes depicted include a loss of a receiver, the addition of a receiver, and a change in the aggregate VXN node availability and/or associated path costs. From Time 1 to Time 2, the receiver 24-6 decides to end participation in the multicast. The receiver 24-6 sends a disconnect signal to the VXN node 16-6, which then discontinues forwarding the packetized data streams to the receiver 24-6. In another implementation, the receiver 24-6 disconnects implicitly by failing to send a required ping or KEEP-ALIVE signal to the VXN node 16-6 or the topology server subsystem 20, as designated by the particular VXN 14 configuration. In this implementation, the VXN node 16-6 or topology server subsystem 20, if appropriate, implies a disconnect condition by the failure to receive the ping during a given length of time. In this instance, as the VXN node 16-6 has no further receivers or VXN nodes subscribing to the packetized data stream through the VXN node 16-6, the VXN node 16-6 sends a disconnect signal to the VXN node 16-8. The VXN node 16-8, in turn, updates its internal table information and ceases sending the VXN node 16-8 the packetized data stream.

The VXN 14 not only allows receivers to disconnect from the multicast session at any time, the VXN 14 allows receivers to join at any time during an ongoing multicast session. From Time 1 to Time 2, a receiver 24-13 joins the multicast by sending the VXN node 16-10, its closest respective edge node, a subscription signal, which, in one implementation, is an empty packet. The VXN node 16-10, as it is already receiving and forwarding the packetized data stream, serves as a multicast point for both the receivers 24-10, 24-13.

Recovery from failures within the VXN nodal complex is automatic with the VXN addressing scheme where both senders and receivers automatically reestablish communication paths periodically. Each data send operation permits the VXN 14 to provide high reliability and a high quality user experience in the presence of faults. By way of example, from Time 1 to Time 2, a fault occurs with the VXN node 16-3 to which the receiver 24-2 is subscribing. Upon detecting this fault, the topology server subsystem 20 generates a new global multicast routing topology map and associated local multicast routing topology maps. In one embodiment, rather than repopulating the VXN 14 with local multicast routing topology maps, the topology server subsystem 20 generates delta local multicast routing topology maps which represent the differences, if any, between the previous and new local multicast routing topology maps. The delta local multicast routing topology maps are then propagated through the VXN 14 and the network elements, whether VXNs or routers, utilize the delta local multicast routing topology maps to update the existing local multicast routing topology maps. Returning to the example of receiver 24-2, this updating occurs in realtime and the receiver 24-2 is substantially instantaneously subscribed to the VXN node 16-4 to continue to participate in the multicast.

In one embodiment, there are three features in the VXN 14 which independently or together provide the functionality of allowing late joining receivers to participate in the multicast; namely, the edge VXN nodes provide immediate subscription to the transmission as discussed, in-progress access, and on-demand access. Returning to receiver 24-13, when such a receiver subscribes to a transmission in progress, the receiver may receive the live feed or the late joining receiver 24-13 may access the in-progress multicast at any point from the inception of the multicast to the live feed. In this embodiment, the VXN node 16-9 is storing the multicast and provides in-progress access. This storage capability, which will be described in further detail hereinbelow, furnishes on-demand access to the multicast following completion. It should be understood that during a broadcast, the VXN 14 permits a receiver to alternate between the live access and in-progress access.

It should be appreciated that the embodiments described in FIGS. 1 through 5 were presented as non-limiting working examples wherein the topologies, number of senders, and number of receivers are solely representative of those which can be employed, and are not exhaustive of those available and operative. Other topologies and sender/receiver scalability are within the teachings of the present invention.

Figure 6:
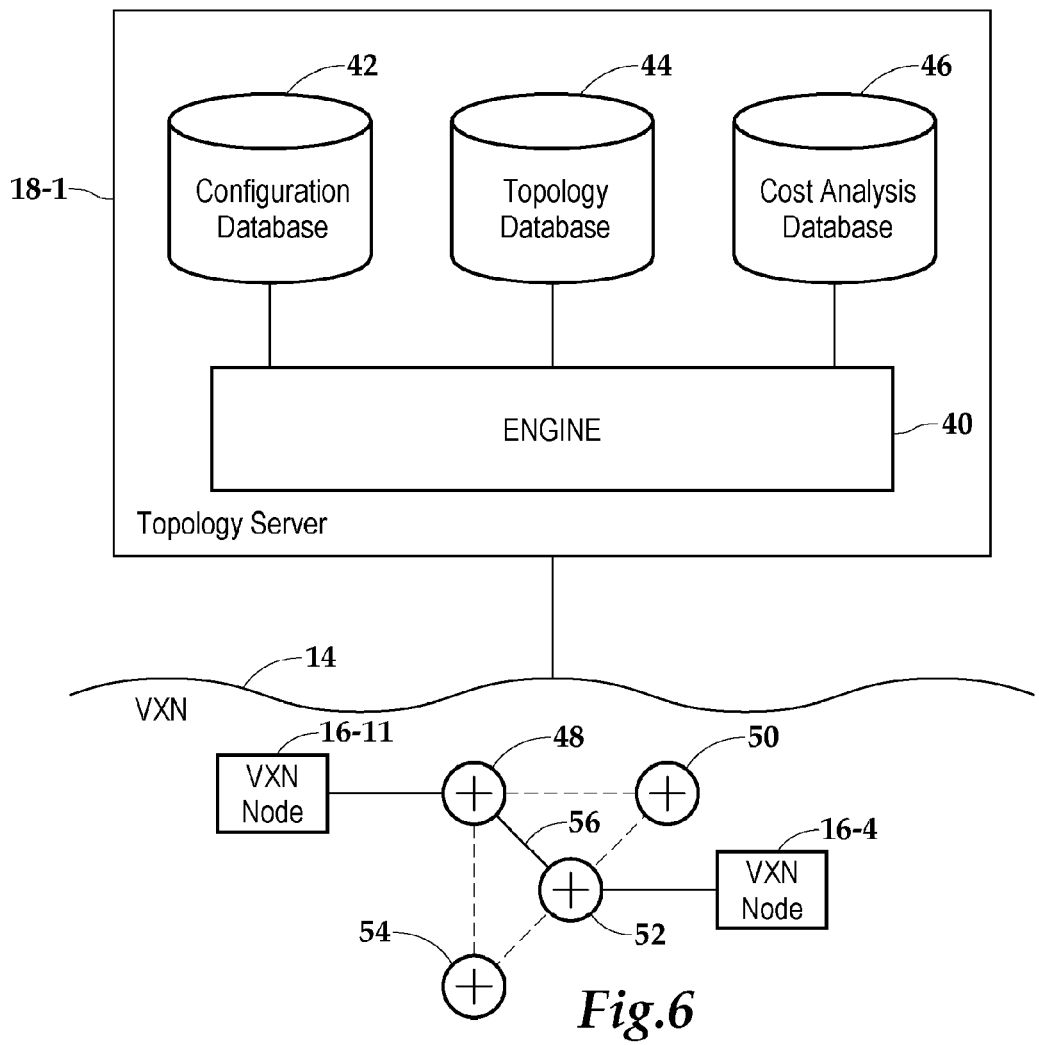
FIG. 6 is a block diagram of one embodiment of the architecture of a topology server.

FIG. 6 depicts one embodiment of the architecture of the topology server 18-1 which includes an engine 40 and multiple databases, a configuration database 42, a topology database 44, and a cost analysis database 46. The topology server is located in communication with the VXN 14 and, for illustrative purposes, monitoring the connection between the VXN nodes 16-11 and 16-4 which may be interconnected by several different paths defined between network elements 48 through 54, which are illustrated as routers.

The topology server 18-1 has complete knowledge of the VXN nodes 16-11, 16-4 and the associated interconnecting network elements 48 through 54. The topology of this portion of the VXN 14 is stored in the topology database 44 as part of the global multicast routing topology. The engine 40 uses this information to perform open shortest path first calculations using an algorithm such as the Dijkstra algorithm. The optimum VXN connections that result from these calculations are stored in the cost analysis database 46. For example, the engine 40 determines that optimum VXN connection 56 from the VXN node 16-11 to the router 48 to the router 52 to the VXN node 16-4 is the optimum path between the VXN node 16-11 and the VXN node 16-4. The local multicast routing topology maps for the illustrated portion of the VXN 14 that provide this information to the VXN nodes 16-11, 16-4 and the network elements 48, 52 are stored in the configuration database 42 for populating the VXN 14. Additionally, should any VXN topology change occur, the engine recalculates the global multicast routing topology map, the optimum VXN connections, the local multicast routing topology maps, as well as the delta local multicast routing topology maps.

FIG. 7 depicts one embodiment of the layered architecture of a VXN node 16-1 having an API 60 superposed on a transport layer 62, and a hardware space 64. The transport layer 62 responds to service requests from the API 60 and issues service requests to lower levels such as a network layer. In the illustrated implementation, the transport layer 62 includes one or more protocols and preferably a suite of protocols. The illustrated protocols include RTCP, RAS, RTP, UDP, H.450.3, H.450.2, H.450.1, H.235, H.245, H.225, and TCP. It should be appreciated however that the transport layer 62 may include any protocol or set of protocols.

A VXN stack 66 includes a channel manager 68, a VXN layer 70, a file system layer 72, a media layer 74, and a gateway layer 76. These components of the VXN stack have access to a live database 80, an in-progress database 82, a lookup database 84, and VXN address tables database 86 which reside in the hardware space 64. In general, in response to receiving a packetized data stream 90 at the VXN layer 70, the channel manager 68 accesses the VXN address tables database 86 to identify the number of subscribers subscribing this particular VXN addressed multicast at VXN node 16-1.

For each N subscribers, the VXN layer 70 utilizes N multicast points 92 to replicate the packetized data stream 90 and simultaneously send N instances of the packetized data stream 90 to the N subscribers as indicated by the numeral 94. On the other hand, in an instance where the channel manager 68 is not yet a subscriber itself to the packetized data stream for which it receives a subscription request, the channel manager 68 may utilize a lookup database to translate any received application assigned or arbitrarily constructed multicast name to the proper VXN address.

The file system layer 72 retains a copy of the packetized data stream 90 and builds a file in the live database 80 of the live multicast. The media layer 74 builds an in-progress file in the in-progress database 82 of the live multicast by repeatedly sampling the live database 80 or concatenating, for example, the packetized data stream 90 onto the existing file in the in-progress database 82. The in-progress file can be rendered to provide a time-shifted multicast while the live multicast is in-progress. This in-progress file is distributed by a VXN node in such a manner that the packetized data streams are transparently and seamlessly received by the receivers. The gateway layer translates the VXN packetized data stream 90 and in-progress file into another protocol, such as HTTP or SIP to permit a receiver to receive the content with only the aid of a browser or other preexisting software application. Alternatively, the gateway layer translates the in-progress file only into another protocol. The time-shifting capability provided by the VXN 14 and the databases 80, 82 allow for the recording of media content while simultaneously serving earlier portions of the recorded content to interested receivers. In particular, this methodology provides for access to in-progress or time-shifted content while the live multicast is continuing.

In one implementation, the VXN 14 and illustrated VXN node 16-1 utilize a flat addressing scheme, which may include a 64-bit addressing scheme. The VXN stack 66 and its enabled protocols are not implemented at the IP level. Rather, the VXN stack 66 is superposed on the transport layer 62 as the VXN 14 enables a multicast network to be constructed out of VXN nodes 16-1 through 16-N that engage in unicast conversations between the individual VXN nodes. In this architecture, the VXN 14 is implemented on top of the existing unicast IP network. Moreover, with this addressing scheme, each of the interconnected nodes in the VXN 14 that is aligned with the optimum virtual exchange network connections includes, for each of the N recipients, a port address and recipient identity associated with the VXN address. This information being associated with VXN address tables database 86 which resides in the hardware space 64.

As previously discussed, a ping message or a KEEP-ALIVE signal is periodically transmitted by endpoints that are subscribers to a particular multicast point, i.e., VXN node, to maintain the subscription in the active status. In one implementation, the KEEP-ALIVE signal is also a SEND operation with no associated data for transmission, like that which can be used to establish a subscription. This indicates that the subscription is active and the recipient is still able to receive data. If the KEEP-ALIVE signal is not received within a specified timeout interval (for example 30 seconds) then the endpoint is considered unsubscribed, and no data is sent to that endpoint after that time, unless the subscription is established again.

With respect to disconnecting or unsubscribing from a multicast point, an endpoint, whether a VXN node or receiver, that wishes to stop receiving data from a multicast point stops sending the KEEP-ALIVE packet to the VXN Point. After the given timeout interval, the VXN multicast point stops sending data to this particular endpoint. If an endpoint is unsubscribed, it must send an empty data packet to the VXN multicast point in order to subscribe again. The same empty data packet used for subscription is also used for KEEP-ALIVE, thus if an endpoint is unsubscribed because the KEEP-ALIVE signal is delayed, the next KEEP-ALIVE signal that arrives is considered a subscription request, and the endpoint is subscribed to the VXN multicast point once again.

Figure 8:
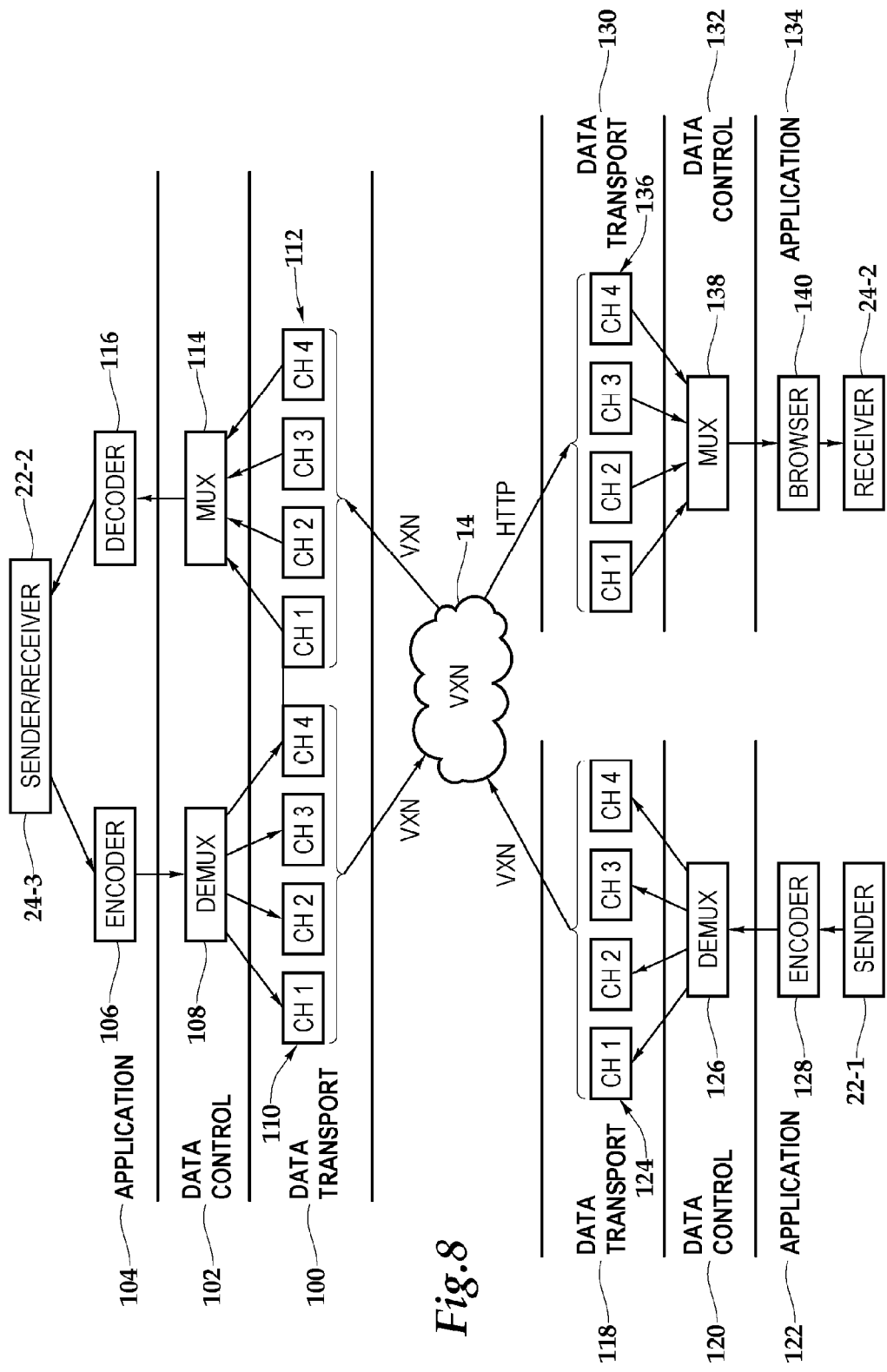
FIG. 8 is a block diagram of one embodiment of the layered architecture of senders and receivers.

FIG. 8 depicts one embodiment of the layered architecture of senders and receivers. The sender/receiver (24-3, 22-2), the sender 22-1, and the receiver 24-2 are each respectively connected to the VXN 14. The sender/receiver (24-3, 22-2) includes a data transport layer 100, a data control layer 102, and an application layer 104. With respect to the sending functionality of the sender/receiver (24-3, 22-2), an encoder 106 digitizes and codes audio-video frames which are then forwarded to a demultiplexer 108 and divided into a number of channels 110 or streams depending on the type of protocol utilized. As illustrated, the streams 110 are then transmitted through the VXN 14 as VXN packetized data streams.

Prior to sending the packetized data streams, when the sender 24-3 connects to one of the VXN nodes of the VXN 14 (selection of a particular node is up to the application) using an operation, the sender 24-3 is assigned a valid VXN address. Other receivers and VXN nodes can now reference this application instance using this assigned VXN address. With respect to the receiver functionality of the sender/receiver (24-3, 22-2), channels 112 or streams received from the VXN 14 at the data transport layer 100 are combined at a multiplexer 114 and then decoded at decoder 116 for rendering to the sender/receiver (24-3, 22-2).

By way of another example, the sender 22-1 includes a similar data transport layer 118, data control layer 120, application layer 122 arrangement including channels 124, a demultiplexer 126, and an encoder 128, respectively. Contrary to the sender/receiver (24-3, 22-2) and sender 22-1, the gateway functionality of the VXN nodes enables the receiver 24-2 to receive HTTP streams rather than the VXN packetized data streams, thereby increasing the potential audience for the content. The receiver 24-2 also includes a data transport layer 130, a data control layer 132, and an application layer 134. Channels 136 are received by the data transport layer 130 and multiplexed at multiplexer 138 before being rendered by a browser 140.

FIGS. 9A and 9B depict one embodiment of a VXN packet structure 150 which may be the aforementioned packetized data stream. With reference to FIG. 9A, the VXN packet 150 includes a header 152 and a payload 154. As previously discussed, the VXN packet 150 is transmitted from a sender to a receiver through the VXN 14 implicitly without any new parameters being added to the existing signaling information elements of the VXN packet 150. With reference to FIG. 9B, in one implementation, the header 152 includes seven segments including a magic number segment 156, a protocol version segment 158, a payload length segment 160, a packet type segment 162, a Time To Live (TTL) segment 164, a source segment 166, and a destination segment 168. The following table, Table I: VXN Packet Segment Definitions, defines the VXN packet segments and table, Table II: VXN Packet Types, defines the VXN packet types.

TABLE I

VXN Packet Segment Definitions

| Packet Segment | Definition |
|---|---|
| Magic number | Hexadecimal Number |
| Protocol version | Version of VXN protocol |
| Payload length | Payload length, not including header |
| Packet type | Please See Table II: VXN Packet Types |
| TTL | Decrementable value set by sender to prevent routing loops |
| Source | IP or other addressing information of the sender |
| Destination | VXN address |

TABLE II

VXN Packet Types

| Packet Type | Definition |
|---|---|
| 0 | Unused - Reserved |
| 1 | Data included to be forwarded |
| 2 | Unused - Reserved |
| 3 | Subscription request |
| 4 | Response to subscription request |
| 5 | Ping message to keep connection alive |
| 6 | Disconnect and terminate data flow - Adaptive topology management |
| 7 | Resume data flow - Adaptive topology management |

In one embodiment of a coded VXN packet 150, the following pseudocode presented in Table III: VXN Packet Pseudocode may be employed.

TABLE III

VXN Packet Pseudocode

```
VXN packet structure
struct vxn_header {
uint8_t magic;              /* magic number 0xBE */
uint8_t version;            /* protocol version */
uint16_t length;            /* payload length, not
                               including header */
#define VH_MSG_UNDEF 0
#define VH_MSG_CLIENT 1     /* data packet to be
                               forwarded */
                            /* 2 unused */
#define VH_MSG_REQUEST_ENDPOINT 3
                            /* Client -> Server
                               endpoint address
                               assignment request */
#define VH_MSG_ENDPOINT 4   /* Server -> Client
                               endpoint address
                               assignment reply */
#define VH_MSG_PING 5       /* Ping message */
#define VH_MSG_STANCH 6     /* Stop data flow */
#define VH_MSG_RESUME 7     /* Resume data flow */
uint8_t type;
uint8_t ttl;                /* time-to-live --
                               discard packet if reaches
                               0 */
uint8_t reserved1;
uint8_t reserved2;
```

TABLE III-continued

VXN Packet Pseudocode

```
vxn_endpoint_t src;         /* source endpoint */
mcast_t dest;               /* destination endpoint
                               */
};
```

It should be appreciated that the embodiments described in FIGS. 6 through 9B were presented as non-limiting working examples wherein the components, networked architectures, and protocols are solely representative of those which can be employed, and are not exhaustive of those available and operative. Other components, networked architectures, and protocols are within the teachings of the present invention.

Figure 10:
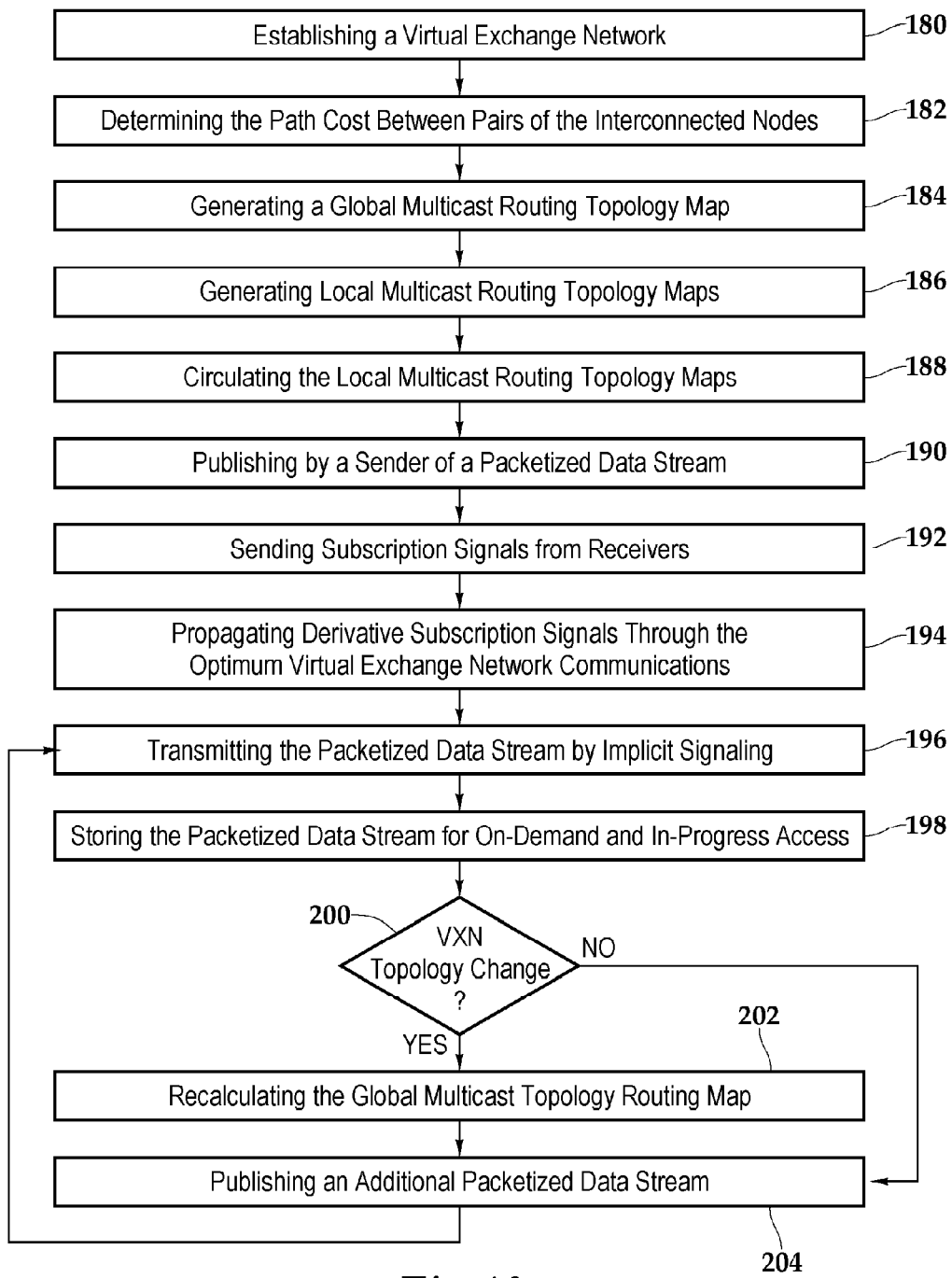
FIG. 10 is a flow chart of one embodiment of a method for multicast transmission according to the teachings presented herein.

FIG. 10 depicts one embodiment of a method for multicast transmission according to the teachings presented herein. At block 180, a virtual exchange network of interconnected nodes and network elements is established within the network. At block 182, the path cost between pairs of the interconnected nodes are determined by a topology server subsystem in communication with the virtual exchange network. It should be understood that the path cost calculations may include the optimum path analysis described earlier. Based on these path costs, the topology server subsystem generates a global multicast routing topology map at block 184. Then, at block 186, the global multicast routing topology map is utilized by the topology server subsystem to generate local multicast routing topology maps.

At block 188, these local multicast routing topology maps are appropriately distributed to the interconnected nodes and network elements. At block 190, the sender of a packetized data stream is disposed in communication with a root node, which is one of the interconnected nodes of the VXN. At this step, the root node may receive the packetized data stream published by the sender. Reciprocally, at block 192, receivers disposed in communication with a set of edge nodes, which form a portion of the interconnected nodes, send subscription signals to the respective edge nodes. At block 194, successively regressive derivative subscription signals are propagated through the optimum virtual exchange network connections until the connection defined by a pair of endpoints is realized. For each of the receivers, the pair of endpoints is respectively the root node and one of the edge nodes. At block 196, the packetized data stream is transmitted by implicit signaling through the optimum virtual exchange network connections from the sender to the plurality of receivers.

At block 198, the packetized data stream is stored for on-demand (post-publication) as well as in-progress access. At decision block 200, if the topology of the VXN has changed then the global multicast topology routing map is recalculated at block 202. At this time the local multicast topology routing maps may be recalculated as well as the delta local multicast topology routing maps. The delta local multicast topology routing maps are propagated through the network as the methodology advances to block 204, wherein additional packetized data streams are published. It the topology had not changed at decision block 200, then the methodology would also have advanced to block 204. From block 204, a return is made to block 196.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for multicast transmission of data over a network, the system comprising:
   a virtual exchange network embedded within the network, the virtual exchange network including a plurality of interconnected nodes;
   a plurality of sender-receivers disposed in communication with a set of edge nodes of the plurality of interconnected nodes, the plurality of sender-receivers configured to publish respective packetized data streams including virtual exchange network addresses, the plurality of sender-receivers configured to respectively subscribe to receive the published packetized data streams;
   a global multicast routing topology map disposed in the virtual exchange network, the global multicast routing topology map including an optimum virtual exchange network connection, the optimum virtual exchange network connection being defined by a pair of endpoints including at least two of the edge nodes of the set of edge nodes; and
   a plurality of local multicast routing topology maps disposed along the optimum virtual exchange network connection, each of the plurality of local multicast routing topology maps being a subset of the global multicast routing topology map to provide routing information for a defined area of the virtual exchange network,
   wherein the packetized data streams are propagated by implicit signaling through the optimum virtual exchange network connection according to the plurality of local multicast routing topology maps.

2. The system as recited in claim 1, wherein each of the plurality of interconnected nodes, responsive to receiving an instance of the published packetized data stream, is adapted to multicast N instances of the published packetized data stream to N recipients selected from the group consisting of receivers and other of the interconnected nodes.

3. The system as recited in claim 2, wherein each of the plurality of interconnected nodes aligned with the plurality of optimum virtual exchange network connections further comprises, for each of the N recipients, a port address and recipient identity associated with the virtual exchange network address.

4. The system as recited in claim 1, wherein each of the plurality of interconnected nodes aligned with the optimum virtual exchange network connection subscribes to receive the published packetized data streams successively regressively along the optimum virtual exchange network connection from one of the set of edge nodes to another of the edge nodes.

5. The system as recited in claim 1, wherein at least one of the edge nodes comprises a root node.

6. The system as recited in claim 1, wherein more than one of the plurality of sender-receivers subscribes to a particular one of the edge nodes.

7. The system as recited in claim 1, further comprising network elements for interconnecting the plurality of interconnected nodes, the network elements having the plurality of local multicast routing topology maps disposed therewith for routing the packetized data streams.

8. The system as recited in claim 1, further comprising a topology server subsystem disposed to communicate with the virtual exchange network, the topology server configured to generate the topology server subsystem.

9. The system as recited in claim 8, wherein the topology server subsystem executes a Dijkstra-based algorithm to calculate path costs and build the global multicast topology routing map.

10. The system as recited in claim 8, wherein the topology server subsystem recalculates the global multicast topology routing map in response to a virtual exchange network topology change.

11. The system as recited in claim 10, wherein the virtual exchange network topology change is selected from the group consisting of loss of a sender-receiver, addition of a sender-receiver, loss of a node, and addition of a node.

* * * * *